United States Patent [19]

Douglas

[11] Patent Number: 4,814,801
[45] Date of Patent: Mar. 21, 1989

[54] INSTANT TYPE CAMERA FOR RECEIVING A COLLAPSIBLE FILM CASSETTE

[75] Inventor: Lawrence M. Douglas, South Easton, Mass.

[73] Assignee: Polaroid Corporation, Cambridge, Mass.

[21] Appl. No.: 193,802

[22] Filed: May 13, 1988

[51] Int. Cl.$^4$ ............................................... G03B 17/52
[52] U.S. Cl. ...................................... 354/86; 354/174; 354/276
[58] Field of Search ....................... 354/83, 84, 85, 86, 354/174, 212, 276, 304

[56] References Cited

U.S. PATENT DOCUMENTS

| | | | |
|---|---|---|---|
| 3,460,452 | 8/1969 | Land | 354/86 |
| 3,643,571 | 2/1972 | Erlichman et al. | 354/174 |
| 3,653,308 | 4/1972 | Erlichman | 354/86 |
| 3,682,062 | 8/1972 | Erlichman | 354/304 X |
| 3,683,771 | 8/1972 | Land | 354/86 |
| 3,687,032 | 8/1972 | Erlichman | 354/212 |
| 3,886,570 | 5/1975 | Asano et al. | 354/86 |
| 3,898,680 | 8/1975 | Asano | 354/174 |
| 3,943,535 | 3/1976 | Asano | 354/174 |

Primary Examiner—A. A. Mathews
Attorney, Agent, or Firm—Alfred E. Corrigan

[57] ABSTRACT

A self-developing or instant camera of the type which receives a collapsible cassette containing a plurality of film units arranged in stacked relationship. Transporting means is provided for moving successive exposed film units from the cassette and transporting each of them to a storage chamber beneath the collapsible cassette. During transportation from an exposure position to the storage chamber, each film unit is processed to initiate the formation of a visible image. Springs beneath the cassette bias a lower section of the cassette upwardly relative to an upper section as the successive exposed film units are removed from the cassette and moved beneath the cassette thereby preventing an increased spring pressure on the stack of exposed film units and utilizing the volume gained by the collapsing cassette to accomodate the stack of exposed film units.

11 Claims, 3 Drawing Sheets

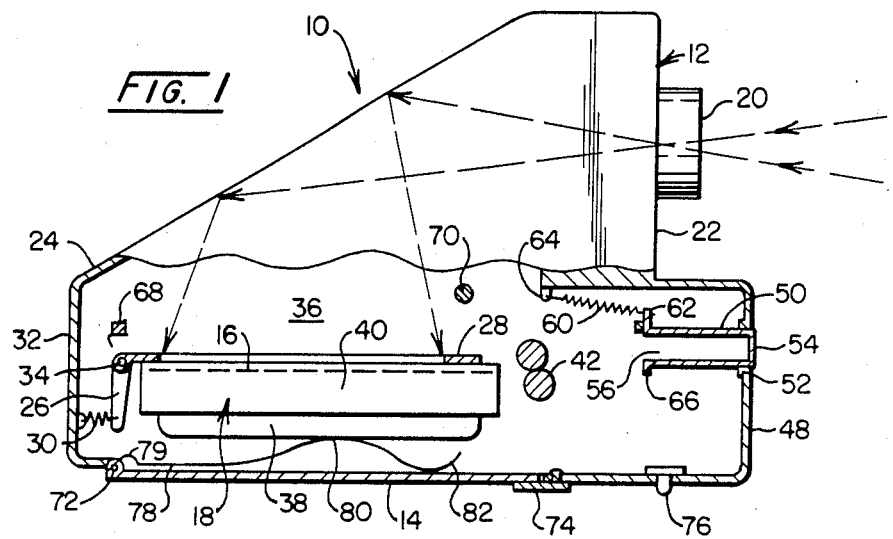
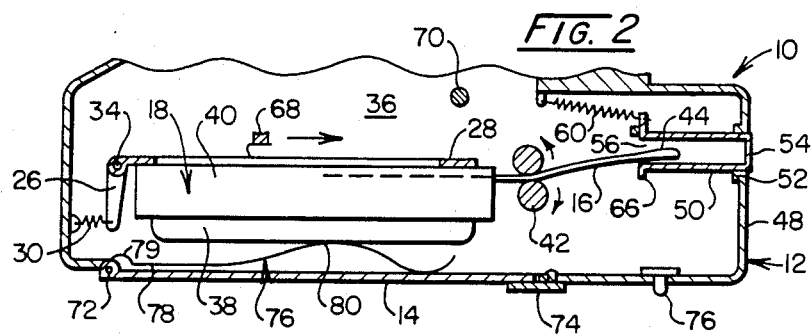
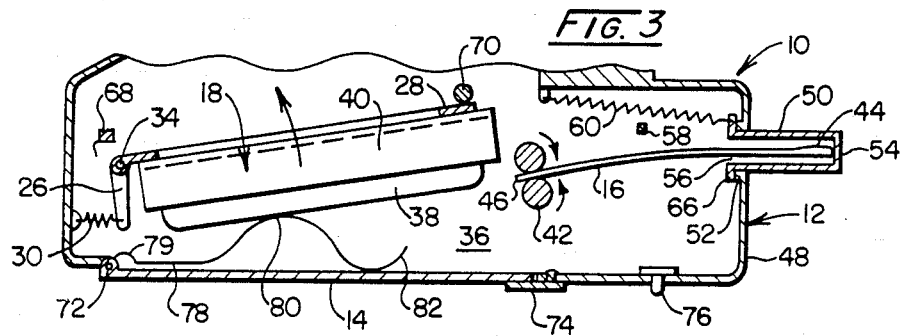

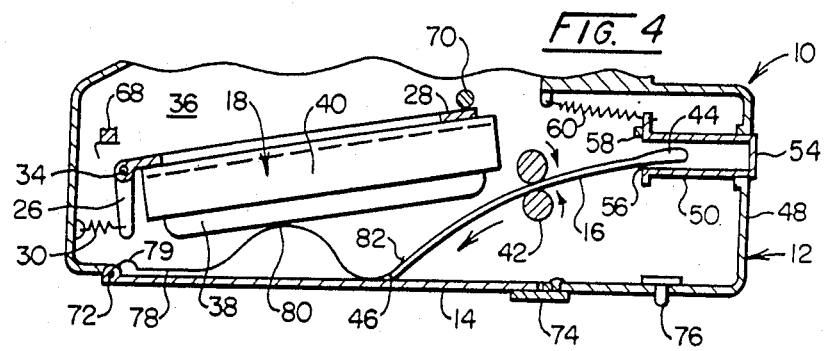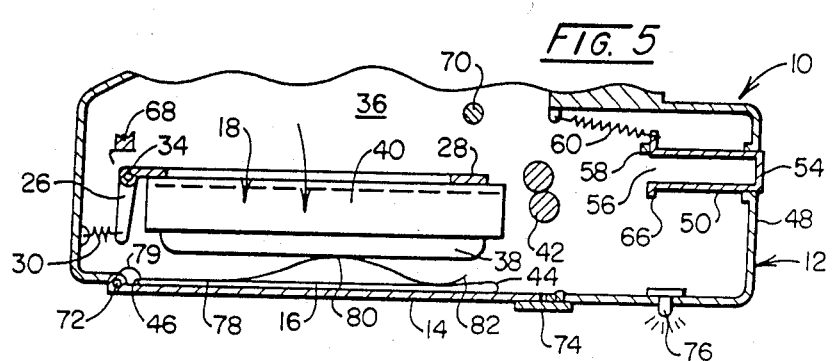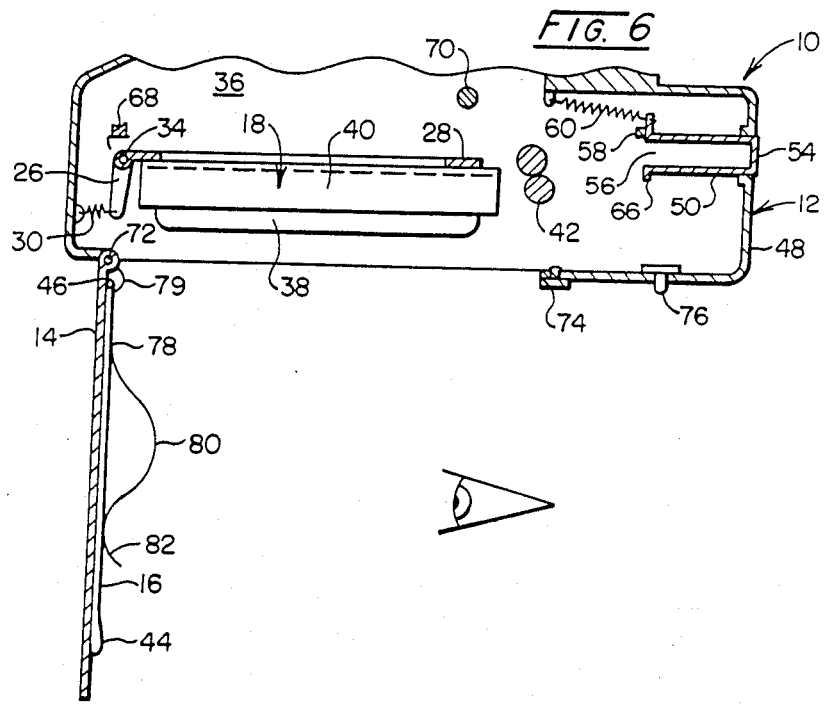

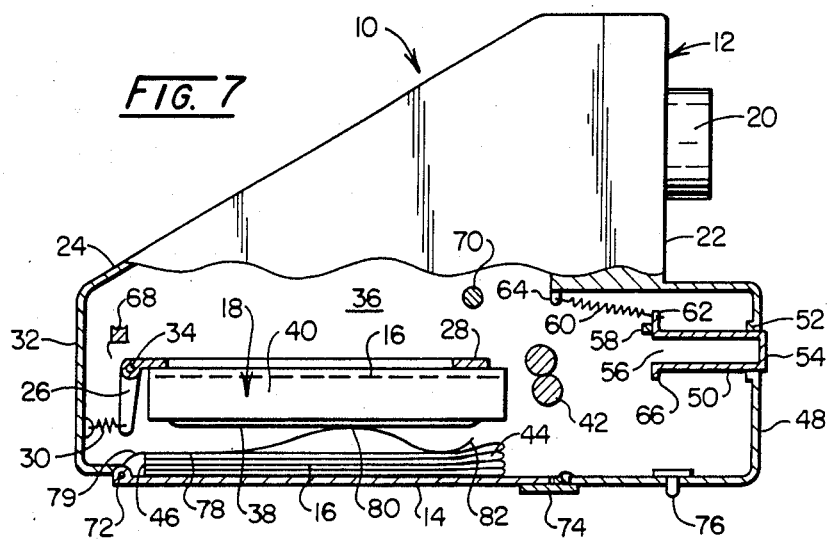

INSTANT TYPE CAMERA FOR RECEIVING A COLLAPSIBLE FILM CASSETTE

RELATED APPLICATION

This application is related to my copending application Ser. No. 193,658 filed on even date herewith and entitled "Photographic Film Assemblage Having Instant Film."

BACKGROUND OF THE INVENTION

1. Field of the Invention

This invention relates generally to photographic apparatus including a camera of the self-developing type and a film assemblage including a plurality of self-developing or instant film units arranged in stacked relationship in a container or cassette. Cameras of this general type include means for positioning the cassette with the uppermost film unit of the stack located in exposure position and means for transporting the successively exposed film units to a storage chamber where they are stacked and can be removed when desired.

2. Description of the Prior Art

An example of this type of camera is illustrated in U.S. Pat. No. 3,683,771 which includes a plurality of sections foldable into a compact inoperative condition and extendable into an operative condition. One section includes a pivoted cassette holder for holding the cassette with its uppermost film unit located in its exposure position. A pair of driven processing rollers for receiving an exposed film unit from the exposure position distributes a processing liquid within the film unit and advances the leading end of the unit out of the camera to a position where it can be grasped by the operator and removed from the bite of the rollers. The film unit is of the type that can be exposed to light immediately after the rollers move its leading end out of the camera. Alternatively, before the trailng end of the film unit emerges from between the rollers, the drive to the rollers is reversed, the film cassette pivoted upwardly and the exposed film unit moved back into the camera to a position beneath the cassette for stacking and storage.

U.S. Pat. No. 3,687,032 discloses a camera similar to that described above but having an expandable dark storage chamber for receiving and stacking successively exposed film units. This expandable camera is composed of sections which expand to provide a dark chamber of maximum volume when the camera is to be operated but decreases that volume when the camera sections are contracted into an inoperative position to decrease the volume of the chamber to the volume necessary to hold only the remaining film units stacked therein.

SUMMARY OF THE INVENTION

This invention is embodied in the camera of the general type indicated in U.S. Pat. No. 3,683,771 and includes a lighttight housing in which the film units are processed. The camera is adapted to receive a cassette of the collapsible type disclosed in my aforementioned copending application. Means is provided in the camera for supporting the cassette in such a position that its upper film unit is disposed in its exposure position, i.e., in the focal plane of the camera's objective lens. These film units are of the type which are processed and developed in a lighttight chamber of the camera. After a film unit has been photographically exposed, it is moved by transporting means between a pair of spread rollers in the camera, which rollers spread a processing liquid between layers of the film unit to initiate the formation of a visible image in the film unit. The film unit is then directed to a lighttight imbibition chamber where it is positioned between a pair of film cassette biasing springs and a camera door. Similarly, as in a camera of the type shown in U.S. Pat. No. 3,460,452, the exposed film unit may be positioned between the cassette biasing springs and a bottom wall of the cassette. It will be apparent from the latter patent that as the successive exposed film units are exposed and moved to this position, the ever-increasing stack of film units will increase the loading of the springs thereby increasing the difficulty of moving an exposed film unit onto the top of the stack. However, the present invention provides a film cassette which is collapsible, thereby ensuring that the force of the springs which engage the bottom wall of the film cassette never exceed their original loading. Indeed, the loading should remain substantially constant. Thus, as an exposed film unit moves out of the film cassette, the springs move a bottom section of the film cassette toward a top section thus (1) reducing the biasing force of the springs, and (2) increasing the effective volume of the imbibition chamber by substantially the volume of film unit removed from the cassette. When that exposed film unit is finally inserted between the springs and the camera bottom wall or door, the springs are forced back into their original positions. The exposed film unit or units remain in this lighttight imbibition storage chamber until the photosensitive layer of each is no longer susceptible to being further exposed by the ambient light. At the end of this time period, e.g., about thirty seconds, a latch, which may be provided on the camera door, is unlocked thus enabling the operator or user of the camera to open the door and move it to a position whereat the last film unit to be exposed and processed may be viewed and/or removed from the camera or left in place when the door is closed.

Each film unit, as it is removed from the cassette, is directed between the processing rollers which continue its movement in the same direction. To permit this movement to remain in dark conditions the camera housing is provided with an extendible chamber. This extendible chamber is lighttight and may be slidably mounted on a forward wall of the camera for receiving the leading end of the moving film unit while still enclosing it in a lighttight environment. The chamber is normally biased into a retracted position. The drive to the processing rollers is reversed as the trailing end of the exposed film unit enters the gap between the rollers thereby driving the film unit in another direction into the lighttight imbibition chamber.

At this time, it should be noted that the processing rollers may rupture the container of processing liquid and spread its contents between layers of the film unit either as they are advancing the exposed film unit in a first direction toward the extendible chamber and away from the film cassette or alternatively the processing rollers may rupture the container as the film unit is being driven in a second direction toward the imbibition chamber. In the first case, the rupturable container of processing liquid would be located on the leading end of the film unit (the end which first enters the bite of the processing rollers) with its rupturable side facing toward the opposite end (trailing end) of the film unit. In the second case, the container of processing liquid would be located on the trailing end of the film unit with its rupturable end facing the film unit's leading end. In this latter case, the rollers would be driven in a first manner to continue the movement of the film unit away from the film cassette until the container just emerges from the bite of the rollers but there still remains a portion of the film unit's trailing end in its bite. The drive to the rollers is then stopped and reversed so as to advance the exposed film unit in a second direction, toward the imbibition chamber, while simultaneously rupturing the container and spreading its contents between layers of the film unit. For an example of this latter case of processing the exposed film unit, reference may be had to the aforementioned U.S. Pat. No. 3,460,452.

BRIEF DESCRIPTION OF THE DRAWINGS

The best mode contemplated in carrying out this invention is illustrated in the accompanying drawings in which:

FIG. 1 is a side elevational view, partly broken away, illustrating photographic apparatus including a self-developing camera and a film cassette shown in its original loaded position;

FIG. 2 is a sectional view of the lower portion of the camera of FIG. 1 with a first exposed film unit of the stack in the cassette engaged by a pair of processing rollers and being directed into an extendible chamber;

FIG. 3 is a view similar to FIG. 2 showing the exposed film unit completely withdrawn from the cassette and permitting upward pivoting of the cassette;

FIG. 4 is a view similar to FIG. 3 but showing the exposed film unit moving in a reverse direction into a storage position beneath the upwardly pivoted cassette;

FIG. 5 is a view similar to FIG. 4 showing the exposed film unit in a storage chamber beneath the downwardly pivoted cassette;

FIG. 6 is a view silmilar to FIG. 5 with the exposed and processed film unit being held on a downwardly opened camera door for viewing or removal; and FIG. 7 is a view similar to FIG. 5 but showing several film units stacked on the camera door with the last film unit to be exposed and processed being located on the top of the stack.

DETAILED DESCRIPTION OF THE INVENTION

With reference to the drawings and specifically to FIGS. 1 and 7, there is illustrated a camera 10 of the general type illustrated in U.S. Pat. No. 3,683,771. This camera may be formed of relatively foldable sections but in the example of FIG. 1 is shown as having a one-piece housing 12 with a bottom hinged door 14 for removing developed film units 16 and for loading a film cassette. These film units 16 are stacked within a collapsible cassette 18 which is specifically disclosed in said copending application. To the extent necessary for a full understanding of this invention said copending application is incorporated herein by reference.

The camera 10 includes an exposure system having an objective lens 20 in a forward wall 22 and a mirror surface on an inclined rear wall 25 for reflecting light from lens 20 toward a film unit 16 located in alignment with an exposure aperture of the film cassette 18. At this time the film cassette 18 is located in its lowermost horizontal position. It is biased into this position by a rocker arm extension 26 which depends from a rectangular pressure frame 28 which bears against the top side of the cassette 18. A biasing spring 30 is connected to the rocker arm extension 26 and to a rear wall 32 of the camera housing 12 to normally tend to swing the frame 28 downwardly about its pivot shaft 34 until it engages a stop (not shown). The frame 28 includes means (not shown) for engaging and supporting opposite sides of the upper portion of the film cassette. The pivot shaft 34 may be carried by side walls 36 of the camera housing 12.

The cassette 18 is collapsible and includes a bottom support section 38 which telescopes upwardly within a top cover section 40. The film units 16 are arranged as a stack within the cassette and each is of the self-developing or instant type and includes superposed layers with a rupturable pod or container of processing liquid at its leading end and the remainder being of substantially uniform thickness to the other end which is the trailing end. These film units, as is well-known in the art, are processed by moving each unit into the bite of a pair of pressure-applying members such as the rollers 42. As the leading pod end 44 of a film unit 16 is fed into the rollers 42, the pod thereof is broken and the processing liquid is spread between the film layers to initiate the formation of a visible image in the film unit.

As indicated in FIG. 1, the rollers 42 are supported with their bite at a level substantially even with the top side of the cassette 18 in its original horizontal position so that an exposed film unit 16 moved from the cassette will enter into the bite of the rollers 42 as indicated in FIG. 2. A plane containing the axes of rollers 42 will form an angle of about 15° with a plane perpendicular to the door 14 of the camera. The reason will be explained subsequently.

The exposed film unit 16 will be moved by the driven rollers 42 to cause the film unit to move to the position shown in FIG. 3 where its trailing end 46 is still gripped by the rollers. However, before that end is completely out of the rollers 42, the rotation of the rollers will be reversed to move the film unit in a reverse direction.

The means for supporting the rollers 42 and driving them and for reversing the drive of the rollers before the extreme trailing end 46 passes from the grip of the rollers are common in the prior art. This means may include controls for actuating the electric driving means to drive the rollers in an advancing direction for a predetermined period of time and then driving them in a reverse direction to reverse the movement of the film. A battery is included in the cassette and when it is inserted into the camera, its contacts engage contacts of the camera circuit (not shown) to supply the necessary power for the camera functions.

As indicated in FIG. 2, with this camera the space from the supported rollers 42 to the lower sidewall portion 48 of the lighttight housing 12 is limited and, therefore, to permit the required movement of the film unit 16 to the right by the rollers 42, as indicated in FIG. 2, a lighttight extendible housing or chamber 50 is provided. The chamber 50 is of rectangular cross section sufficient to receive the film unit 16 and is telescopically arranged in the sidewall portion 48 of the housing 12 in a bearing 52 for sliding movement from a retracted position (FIG. 1) to an extended position (FIG. 3.) The outer end of the chamber 50 is closed at 54 to prevent the entrance of light and is open at its inner end 56 to permit entrance of the exposed film unit 16. It is biased into its innermost position against a stop 58 by a spring 60 which is connected to the inner end thereof at 62 and is anchored to the camera housing at 64. Outward movement is limited by a stop shoulder 66 on the inner end of the chamber 50 which is adapted to engage the bearing 52 at the end of this outward movement.

Transporting means including a reciprocable pick slide 68 of a type common in the art which may be operated by a solenoid (not shown) of the camera circuit will engage the uppermost film unit 16 of the stack in the cassette 18, subseuqent to its exposure, and move it from the cassette into the bite of the rollers 42.

Mechanical means (not shown) pivot the right hand side of the cassette upward after the exposed film unit 16 leaves the cassette. A stop rod 70 is supported transversely of the housing 12 to limit upward swinging of the cassette engaging frame 28 about its pivot shaft 34.

As indicated, the bottom of the housing 12 is normally closed by the door 14 which is hinged to the housing at a transverse hinge 72. The door is normally latched in closed position by a latch 74. For the desired dark period of the camera a signal light 76 may be provided on the bottom wall of the camera and this may be activated by a timer along with means for preventing release of the latch 74 (to permit opening of the door 14) for a predetermined period of time, e.g. 30 seconds.

The camera door 14 carries a pair of laterally spaced leaf springs 76 for engaging the bottom section 38 of the cassette 18 and biasing it upwardly. Only one spring is shown but each comprises a flat end section 78 secured at its curved extremity 79 to the door 14 adjacent the hinge 72. Its intermediate portion is upwardly bowed at 80 and it has a free end 82 which resiliently engages the door and is curved upwardly into diverging relationship to the upper surface of the door 14 to provide a flared mouth for receiving the end of the exposed film unit 16. In the relaxed condition of the spring 76, the bow 80 is extended upwardly as shown in FIGS. 3 and 4 and in a compressed condition, as shown in FIGS. 2, 5 and 7, the bow is pressed downwardly.

The cassette 18 is loaded into the camera through the opened door 14. When the door is closed, the springs 80 will engage the bottom section 38 thereof at its margins. The cassette will be in a position for the pick slide 68 to engage the top film 16 thereof which will be in its exposure position. As indicated in said copending application, the upper section 40 of the cassette carries a flexible dark slide to cover its exposure aperture until the cassette is mounted in the camera housing. This slide is not shown but is removed in the camera in the same manner as the uppermost film unit by the pick slide 68 and is transported to a position beneath the springs 76 on the door 14.

Assuming that the uppermost film unit 16 in the camera-mounted cassette 18 is positioned for exposure as indicated in FIG. 1, it is exposed for a selected period and then the transporting means including pick slide 68 and rollers 42 transport it from that position to the storage and lighttight imbibition chamber beneath the cassette 18. First, the slide 68 engages the film unit 16 at its trailing end 46 and advances it into the bite of the spread rollers 42, as shown in FIG. 2. As the leading pod end 44 passes into and through the rollers 42, the pod is ruptured to spread the processing liquid between selected layers of the exposed film unit 16. This ruptured pod end 44 will be directed into the chamber 50 engaging its closed end 54 to extend it into the position shown in FIG. 3. Before the exposed film unit 16 leaves the bite of the rollers 42, the rollers are stopped with the trailing end 46 still in the bite of the rollers. When the rollers are stopped, the cassette 18 is pivoted upwardly into contact with the stop 70. At this time the pick slide 68 has moved back to its original position outwardly of pivot 34 to permit this upward swinging. The spread rollers are now rotated in a reverse direction as shown in FIG. 4 to move the end 46 of the exposed film unit 16 under the elevated cassette 18 and under the border springs 76 which engage the film unit at its side marginal sides only. Entrance beneath the springs 76 will be facilitated by their upturned ends 82 and the relaxed or untensioned condition of the springs. The aforementioned angular orientation of the rollers 42 serves to direct the exposed film unit 16 toward the open mouth formed between the door 14 and the free ends of springs 76. Alternatively, the film units 16 could be directed between the springs 76 and the bottom section 38 of the cassette by changing the configuration of the springs 76.

During the reverse movement of the exposed film unit 16, the chamber 50 is retracted to its original position by the spring 60. As the film unit moves beneath the expanded springs 76, it is flattened by the light force thereof against the inner surface of the door 14. Then the rollers stop and the cassette 18 swings downwardly to compress the springs 76 to keep the film flat as shown in FIG. 5.

With the exposed film unit 16 in the storage chamber below the cassette 18, the warning light 76 will be illuminated reminding the user not to open the door 14 until the light goes out at the end of the imbibition period. As indicated, the latch 76 may be electronically latched and unlatched. After the imbibition period, the door 14 may be swung into its open position with the film unit 16 held thereon for viewing or removal as shown in FIG. 6. A plurality of the stacked film units in the storage position are indicated in FIG. 7 illustrating that it is unnecessary to remove each exposed unit 16 before the next unit in sequence. Further, it should be noted that as each succeeding exposed film unit approaches the stack, its leading end will engage the uppermost film unit in the stack and then move between it and the upturned ends 82 of the springs thus ensuring that the last film unit to be exposed will always be located on the top of the stack for inspection.

It will be apparent from the above that the successive film units 16 are removed from the collapsible film cassette 18 by the pick slide 68 and transported to the storage chamber where they are successively stacked between the spring 76 located on the bottom door 14 or wall of the camera and the cassette 18. Since the cassette 18 is collapsible there will be no difficulty in moving additional exposed film units 16 onto the stack because as a film unit moves out of the cassette, the springs 76 move the telescoping bottom section 40 thus temporarily reducing the biasing force of the springs. The collapsible cassette 18 ensures that the springs 76 never exceed their original loading as the first film unit moves beneath the springs 76 and successive film units 16 are added to the stack. When the exposed film unit 16 is finally inserted between the springs 76 and the camera bottom section 38, the springs 76 are forced back into their original condition. Further, the movement of exposed film units onto the top of the stack is further facilitated because the volume of the storage-imbibition chamber had just been incrementally increased by an amount substantially equal to that of the entering exposed film unit which had just been removed from within the film cassette 18.

Since certain changes may be made in the above apparatus without departing from the scope of the invention herein described, it is intended that all matter contained in the above description or shown in the accompanying drawings be interpreted as illustrative and not in a limiting sense.

What is claimed is:

1. Photographic apparatus comprising:
    a film assemblage including
        a cassette having forward and rear walls constructed from movement toward each other as film units are sequentially removed therefrom, said forward wall including an exposure aperture through which a film unit may be exposed; and
        a plurality of self-developing film units arranged in a stack within said cassette, each of said film units includes a rupturable container of processing liquid secured to one end thereto;
    a camera including
        means for supporting said cassette in position for the sequential exposure of said film units;
        means for advancing one of said film units, subsequent to its exposure, in a first direction from said film cassette via an egress therein;
        a pair of elongate rollers mounted to receive said exposed film unit, said rollers being adapted to be driven in a first manner to continue the movement thereof in said first direction and in a second manner to advance said exposed film unit in a second direction into a storage chamber, said rollers being adapted to rupture said container of processing liquid and spread its contents between layers of said exposed film unit to initiate the formation of a visible image;
        means defining a storage chamber for receiving said exposed film unit, said storage chamber having a volume which incrementally increases as film units are sequentially removed from said film cassette; and
        means for resiliently biasing said rear wall of said cassette toward said forward wall such that upon the removal of an exposed film unit from said film cassette its volume is decreased by an amount substantially equal to that of said exposed film unit, whereby the volume of said storage chamber is increased by a corresponding amount to facilitate entry of said exposed film unit into said storage chamber.

2. Photographic apparatus as defined in claim 1 wherein said means for supporting said film cassette includes means for mounting it for movement to a position which facilitates movement of said exposed film unit into said storage chamber.

3. Photographic apparatus as defined in claim 2 wherein each of said film units includes a leading end having said rupturable container of processing liquid thereon and said rollers are adapted to rupture said container during movement of said exposed film unit in said first direction.

4. Photographic apparatus as defined in claim 1 in which said cassette is formed of telescoping upper and lower sections.

5. Photographic apparatus as defined in claim 1 in which said biasing means includes spring means carried by a wall of said storage chamber and beneath which said exposed film units are successively positioned in a stack.

6. Photographic apparatus as defined in claim 5 in which said spring means is in the form of one or more leaf springs having an inner end attached to said wall of said storage chamber and having an upwardly-bowed section engaging said cassette and a free outer end.

7. Photographic apparatus as defined in claim 6 in which said free outer end of each of said springs is curved upwardly relative to said wall to facilitate movement of said exposed film units beneath it.

8. Photographic apparatus as defined in claim 1 wherein said camera further includes an extendible dark chamber for momentarily receiving a portion of said exposed film unit as it is being advanced in said first direction by said rollers.

9. Photographic apparatus as defined in claim 1 wherein said means defining a storage chamber includes a film cassette loading door and said biasing means are mounted on said door.

10. Photographic apparatus as defined in claim 9 wherein said rollers drive said exposed film unit to a position between said door and said biasing means.

11. Photographic apparatus as defined in claim 10 wherein said biasing means are constructed to releasably hold said exposed film unit to said door for viewing of its image when the latter is moved to an open position.

* * * * *